United States Patent [19]

Germann

[11] 4,351,107
[45] Sep. 28, 1982

[54] APPARATUS FOR COMPRESSING WINDING ELEMENTS IN AN ELECTRIC MACHINE

[75] Inventor: Willy Germann, Wurenlos, Switzerland

[73] Assignee: BBC Brown, Boveri & Company, Ltd., Baden, Switzerland

[21] Appl. No.: 184,886

[22] Filed: Sep. 8, 1980

Related U.S. Application Data

[63] Continuation of Ser. No. 6,127, Jan. 24, 1979, abandoned.

[30] Foreign Application Priority Data

Jan. 25, 1978 [CH] Switzerland .......................... 790/78

[51] Int. Cl.³ ............................................. H02K 15/06
[52] U.S. Cl. ....................................... 29/736; 29/596; 29/606

[58] Field of Search ................. 29/596, 598, 606, 732, 29/734, 736, 421 R; 310/214, 42

[56] References Cited

U.S. PATENT DOCUMENTS 3,487,526  1/1970  Larsen et al. ......................... 29/732
3,624,432  11/1971 Merz ................................. 310/214 X
3,629,925  12/1971 Brown, Jr. et al. .............. 29/596 X
3,952,406  4/1976  Madsen ........................... 310/214 X Primary Examiner—Carl E. Hall
Attorney, Agent, or Firm—Burns, Doane, Swecker & Mathis

[57] ABSTRACT

The disclosure relates to a method and apparatus for compressing winding elements in the slot of an electric machine with a pneumatic compressing element, which, in a preferred embodiment, consists of a rubber bellows, configured for insertion in the slot, with a rigid conduit disposed inside the bellows for delivering pressurized fluid to the bellows.

1 Claim, 2 Drawing Figures

APPARATUS FOR COMPRESSING WINDING ELEMENTS IN AN ELECTRIC MACHINE

This is a continuation, of application Ser. No. 6,127, filed Jan. 24, 1979 now abandoned.

BACKGROUND OF THE INVENTION

It is generally known that windings placed in slots of electric machines must be compressed properly for maximum utilization of the slot profile and in order to prevent any substantial displacement of the windings due to centrifugal forces and/or magnetic forces. Heretofore, windings were inserted into a slot and then compressed by a keyway, possibly assisted by a spring biased support. However, a satisfactory compression of the winding elements may not be effectively and economically accomplished in this manner.

Accordingly it is a principal object of the present invention to provide a method and apparatus for compressing winding elements in slots of electric machines in an economical and efficient fashion.

It is another object of the present invention to provide a method and apparatus for achieving a high state of compression in the winding elements of an electric machine.

These and other objects and features of the invention will become apparent from the claims and from the following description when read in conjunction with the accompanying drawings.

THE DRAWINGS

DETAILED DESCRIPTION

The present invention relates to a method and apparatus for compressing winding elements in a slot formation of an electric machine. According to the method of the present invention, at least one winding element of the electric machine is inserted in the slot formation of the electric machine. An elastic bellows is inserted in the slot formation and pressurized so that the elastic bellows contacts the winding element. The expansion of the bellows causes the winding element to be compressed into the slot. The above described steps can be repeated for additional winding elements until a complete winding is built up.

In a preferred embodiment of the present invention, the elastic bellows is dimensioned and configured for insertion in the slot and has side wall portions adapted to engage side walls of the slot when the bellows is pressurized. In addition, a bellows is formed with an end portion adapted to contact at least one winding element in the slot and to compress the winding element when the bellows is pressurized. A rigid conduit is disposed within the bellows in sealing engagement with the sidewall of the bellows. The rigid conduit is employed to conduct pressurized fluid to the interior of the bellows to expand the bellows so that its side walls contact the side walls of the slot and so that the end portion of the bellows expands to compress the winding element.

Figure 1:
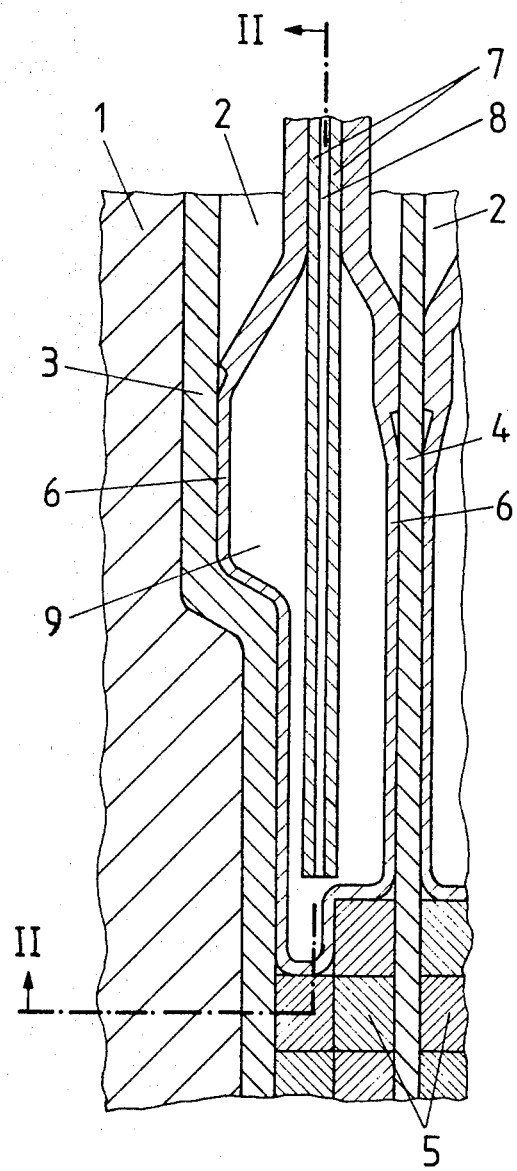
FIG. 1 is a cross-sectional view of an embodiment of the winding compressing apparatus of the present invention, inserted in a slot of an electric machine.
Figure 2:
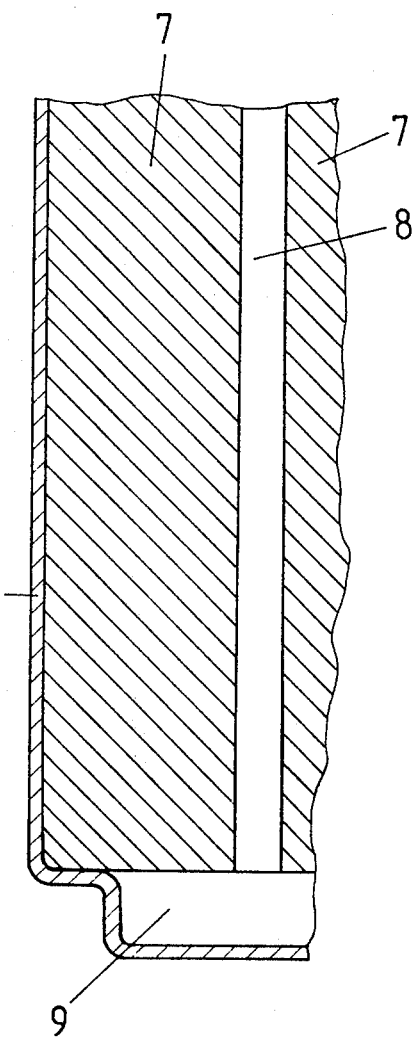
FIG. 2 is a cross-sectional view of the embodiment of FIG. 1 taken along line II—II.

FIGS. 1 and 2 are cross-sectional views of an embodiment of the present invention wherein like numerals are used to identify like sructures and features. In FIG. 1 the apparatus is shown inserted in a slot 2 of an electric machine such as a slot formed in a rotor 1 or other winding carrying structure within the electric machine. The interior of the slot may be defined by insulation 3 and a winding separator 4. As shown in the figure, the windings 5 are disposed in the slot between the insulation 3 and the separator 4.

A preferred embodiment of the present invention comprises rubber bellows 6 and a conduit 7 for carrying compressed air to the interior of the bellows via the duct 8. Advantageously, the conduit 7 may be formed from aluminum or another metal or a hard synthetic material. The bellows may be fabricated from rubber or other elastic material such as an elastimer.

FIG. 1 illustrates the slot 2 with one portion of the winding elements inserted therein. The bellows 6 may be inserted in the slot the filled with a pressure medium in the space denoted generally by the numeral 9. The pressurization of the bellows compresses the winding element 5. It may be noted in particular that the end portion of the bellows 6, as shown in FIG. 1, conforms to the shape of the windings 5 during pressurization. Once the windings are compressed, the pressurization medium may be allowed to flow out of the bellows through the duct 8 and a valve (not shown). When the bellows have been depressurized, the bellows may be removed from the slot and another winding element 5 may then be inserted into the slot and the process repeated.

Advantageously, the method and apparatus of the present invention may be employed to achieve compression of windings in endless slots. Moreover, the method and apparatus permits the use of relatively low pressures to obtain proper compression of the windings by repeated application of the compression process after the insertion of each additional winding elements. In addition, varying pressure can be applied by means of the bellows and can be adjusted according to the position of the winding within the slot.

The compression element can be designed in the form of hydraulic or a pneumatic pressure element. The hydraulic pressure element is particularly suitable for performing compression in the presence of heat.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. An apparatus for compressing winding elements in slots of the core of an electric machine comprising:
   an inflatable elastic, rubber bellows for insertion in a slot of the electric machine; and
   a rigid plate formed with at least one conduit leading to the interior of the elastic bellows and fastened to the elastic bellows for supplying a pressurized medium to the interior of the elastic bellows to compress windings in the core as the conductors are built up in the slot and through which the elastic bellows is depressurized for removal from the core.

* * * * *